(12) United States Patent
Cheng et al.

(10) Patent No.: US 11,553,542 B2
(45) Date of Patent: Jan. 10, 2023

(54) DEVICE-TO-DEVICE SIGNALING

(71) Applicant: QUALCOMM Incorporated, San Diego, CA (US)

(72) Inventors: Hong Cheng, Bridgewater, NJ (US); Zhibin Wu, Los Altos, CA (US); Sudhir Kumar Baghel, Hillsborough, NJ (US); Kapil Gulati, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 71 days.

(21) Appl. No.: 16/711,068

(22) Filed: Dec. 11, 2019

(65) Prior Publication Data

US 2020/0229249 A1     Jul. 16, 2020

Related U.S. Application Data

(60) Provisional application No. 62/791,362, filed on Jan. 11, 2019.

(51) Int. Cl.
*H04W 76/14* (2018.01)
*H04W 76/27* (2018.01)
(Continued)

(52) U.S. Cl.
CPC ............. *H04W 76/14* (2018.02); *H04W 4/40* (2018.02); *H04W 48/16* (2013.01); *H04W 76/27* (2018.02); *H04W 80/02* (2013.01)

(58) Field of Classification Search
CPC ..... H04W 76/14; H04W 76/27; H04W 48/16; H04W 4/40; H04W 80/02; H04W 4/46; H04W 8/005; Y04S 40/18; H04L 67/12
See application file for complete search history.

(56) References Cited

U.S. PATENT DOCUMENTS

2008/0125111 A1* 5/2008 Durig .................. H04L 69/16
                                                    455/552.1
2017/0230956 A1* 8/2017 Kim .................... H04B 1/713
(Continued)

FOREIGN PATENT DOCUMENTS

EP          3148285 A1      3/2017
WO       2018125686 A2      7/2018
(Continued)

OTHER PUBLICATIONS

International Search Report and Written Opinion PCT/US2019/066037 ISA/EPO dated Apr. 9, 2020.

*Primary Examiner* — Diane D Mizrahi
(74) *Attorney, Agent, or Firm* — Danai Nelisile Mhembere; Harrity & Harrity, LLP

(57) ABSTRACT

Various aspects of the present disclosure generally relate to wireless communication. In some aspects, a first user equipment (UE) may encapsulate, into a link layer sidelink management message, upper layer signaling for managing a direct communication connection with a second UE. The first UE may transmit, to the second UE, the link layer sidelink management message including the upper layer signaling. The second UE may selectively transmit, to the first UE, a link layer sidelink response message based at least in part on a content of the upper layer signaling in the link layer sidelink management message. Numerous other aspects are provided.

41 Claims, 8 Drawing Sheets

(51) Int. Cl.
*H04W 48/16* (2009.01)
*H04W 4/40* (2018.01)
*H04W 80/02* (2009.01)

(56) References Cited

U.S. PATENT DOCUMENTS

2017/0245245 A1* 8/2017 Kim .................. H04W 72/1284
2017/0331577 A1* 11/2017 Parkvall ............... H04B 7/0848
2019/0014564 A1* 1/2019 Lee .................... H04W 72/1257
2019/0394816 A1 12/2019 Kim

FOREIGN PATENT DOCUMENTS

WO 2018155908 A1 8/2018
WO 2019137473 A1 7/2019

* cited by examiner

DEVICE-TO-DEVICE SIGNALING

CROSS-REFERENCE TO RELATED APPLICATION

This application claims priority to U.S. Provisional Application No. 62/791,362, filed on Jan. 11, 2019, entitled "DEVICE-TO-DEVICE SIGNALING," which is hereby expressly incorporated by reference herein.

INTRODUCTION

Aspects of the present disclosure generally relate to wireless communication, and to techniques and apparatuses for device-to-device, such as vehicle-to-vehicle (V2V), signaling.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a first user equipment (UE), may include encapsulating, into a link layer sidelink management message, upper layer signaling for managing a direct communication connection with a second UE. The method may include transmitting, to the second UE, the link layer sidelink management message including the upper layer signaling.

In some aspects, a first UE for wireless communication may include memory and one or more processors coupled to the memory. The memory and the one or more processors may be configured to encapsulate, into a link layer sidelink management message, upper layer signaling for managing a direct communication connection with a second UE. The memory and the one or more processors may be configured to transmit, to the second UE, the link layer sidelink management message including the upper layer signaling.

In some aspects, a non-transitory computer-readable medium may store one or more instructions for wireless communication. The one or more instructions, when executed by one or more processors of a first UE, may cause the one or more processors to encapsulate, into a link layer sidelink management message, upper layer signaling for managing a direct communication connection with a second UE. The one or more instructions, when executed by the one or more processors of the first UE, may cause the one or more processors to transmit, to the second UE, the link layer sidelink management message including the upper layer signaling.

In some aspects, an apparatus for wireless communication may include means for encapsulating, into a link layer sidelink management message, upper layer signaling for managing a direct communication connection with a UE. The apparatus may include means for transmitting, to the UE, the link layer sidelink management message including the upper layer signaling.

In some aspects, a method of wireless communication, performed by a second user equipment (UE), may include receiving, from a first UE, a link layer sidelink management message that conveys upper layer signaling. The method may include selectively transmitting, to the first UE, a link layer sidelink response message based at least in part on a content of the upper layer signaling in the link layer sidelink management message.

In some aspects, a second UE for wireless communication may include memory and one or more processors coupled to the memory. The memory and the one or more processors may be configured to receive, from a first UE, a link layer sidelink management message that conveys upper layer signaling. The memory and the one or more processors may be configured to selectively transmit, to the first UE, a link layer sidelink response message based at least in part on a content of the upper layer signaling in the link layer sidelink management message.

In some aspects, a non-transitory computer-readable medium may store one or more instructions for wireless communication. The one or more instructions, when executed by one or more processors of a second UE, may cause the one or more processors to receive, from a first UE, a link layer sidelink management message that conveys upper layer signaling. The one or more instructions, when executed by the one or more processors of the second UE, may cause the one or more processors to selectively transmit, to the first UE, a link layer sidelink response message based at least in part on a content of the upper layer signaling in the link layer sidelink management message.

In some aspects, an apparatus for wireless communication may include means for receiving, from a UE, a link layer sidelink management message that conveys upper layer signaling. The apparatus may include means for selectively transmitting, to the UE, a link layer sidelink response message based at least in part on a content of the upper layer signaling in the link layer sidelink management message.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
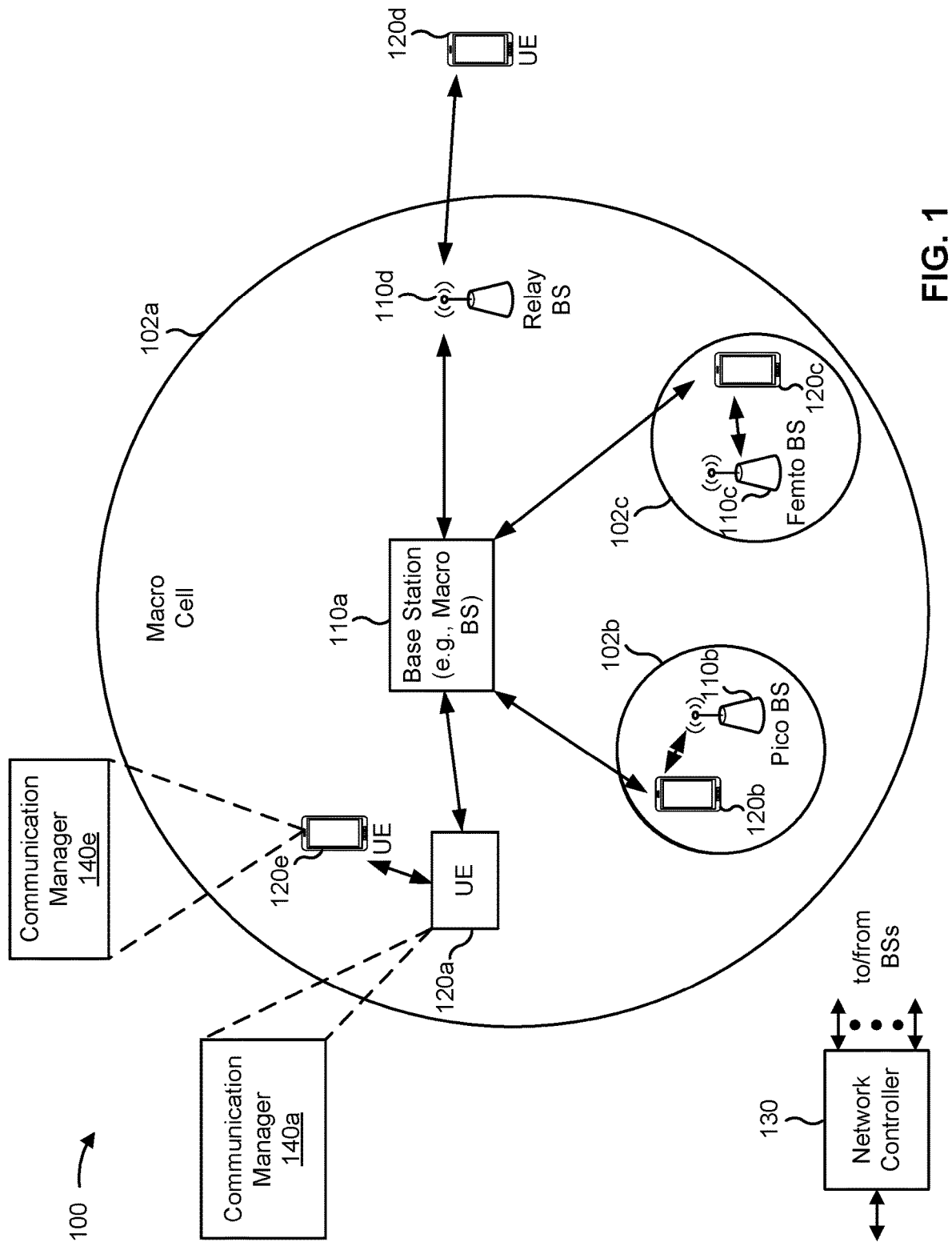
FIG. 1 is a block diagram conceptually illustrating an example of a wireless communication network, in accordance with various aspects of the present disclosure.

In some communications systems, two or more subordinate entities (e.g., UEs) may communicate with each other using sidelink signals. Real-world applications of such sidelink communications may include public safety, proximity services, UE to network relaying, vehicle to vehicle (V2V) communications, vehicle to everything (V2X) communications, Internet of Everything (IoE) communications, IoT communications, mission-critical mesh communications, peer to peer (P2P) communications, device to device (D2D) communications, and/or various other suitable applications. Although some aspects are described herein in terms of V2X communications, other sidelink communications are possible.

Generally, a sidelink signal may refer to a signal communicated from one subordinate entity to another subordinate entity without relaying that communication through a scheduling entity (e.g., a UE or a BS), even though the scheduling entity may be utilized for scheduling and/or control purposes. Although some aspects described herein are described in terms of a UE being a subordinate entity, other configurations are possible, such as a BS being a subordinate entity. In some cases, sidelink communications may occur in unlicensed spectrum, which may use spectrum sharing.

V2X communications (e.g., for public safety use cases and non-public safety use cases) may use a broadcast link layer at a physical layer and media access control (MAC) layer. As a result, radio resource control (RRC) signaling procedures may not be defined for V2X communications. In some communications systems, a pre-configuration procedure (e.g., for public safety use cases) or a direct discovery procedure (e.g., for non-public safety use cases) may be defined for NR PC5 protocol unicast support in V2X communications or other sidelink communications. Moreover, NR PC5 protocol procedures may use a destination link layer identifier (L2 ID) (e.g., of a destination UE) that may be known by a source UE. However, for unicast link management in NR PC5 protocol, an L2 ID of a destination UE may not be known to the source UE. As V2X does not define cross-layer interactions for unicast link management, a source UE may be unable to use a radio resource control (RRC) layer signaling to enable unicast link management.

Some aspects described herein define V2X layer signaling to enable cross layer interactions for unicast link management for NR PC5 protocol. For example, a first UE may encapsulate V2X layer signaling in a PC5 link management message to enable a dynamic unicast PC5 link to be established. In this case, the first UE may include upper layer information in a PC5 link management message to support L2 ID discovery, as described in more detail herein. In this way, the first UE enables management of a V2X communication link. Although some aspects are described herein in terms of sidelink and/or V2X communication, other types of device-to-device communication may be possible, such as V2V communication, P2P communication, IoT communication, a combination thereof, and/or the like.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, a combination thereof, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network, a 5G or NR network, and/or the like. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), a combination thereof, and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. The BS may perform some scheduling and/or control in the network, such as by indicating to UEs a resource grid that the UEs are to use. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may also provide information identifying a resource grid that UEs may use, such as information identifying a location of subchannels, a timing of slots, and/or the like. Network controller 130 may communicate with the BSs via a backhaul. The BSs may also communicate with one another, e.g., directly or indirectly via a wireless or wireline backhaul. UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

As shown in FIG. 1, the UE 120*a* may include a communication manager 140*a*, and may be in communication (e.g., sidelink communication or another type of device-to-device communication) with UE 120*e*, which may include a communication manager 140*e*. As described in more detail elsewhere herein, communication managers 140 (e.g., communication manager 140*a*, communication manager 140*e*, and/or the like) may encapsulate, into a link layer sidelink management message, upper layer signaling for managing a direct communication connection with a corresponding UE 120 (e.g., UE 120*a*, UE 120*e*, and/or the like). Additionally, or alternatively, for example, the communication manager 140*a* may cause UE 120*a* to transmit the link layer sidelink management message to UE 120*e* to enable management of V2X communications between UE 120*a* and UE 120*e*. Similarly, the communication manager 140*e* may cause UE 120*e* to transmit response messages to enable management of V2X communications between UE 120*a* and UE 120*e*. Additionally, or alternatively, the communication managers 140 may perform one or more other operations described herein.

As indicated above, FIG. 1 is provided merely as an example. Other examples may differ from what was described with regard to FIG. 1.

Figure 2:
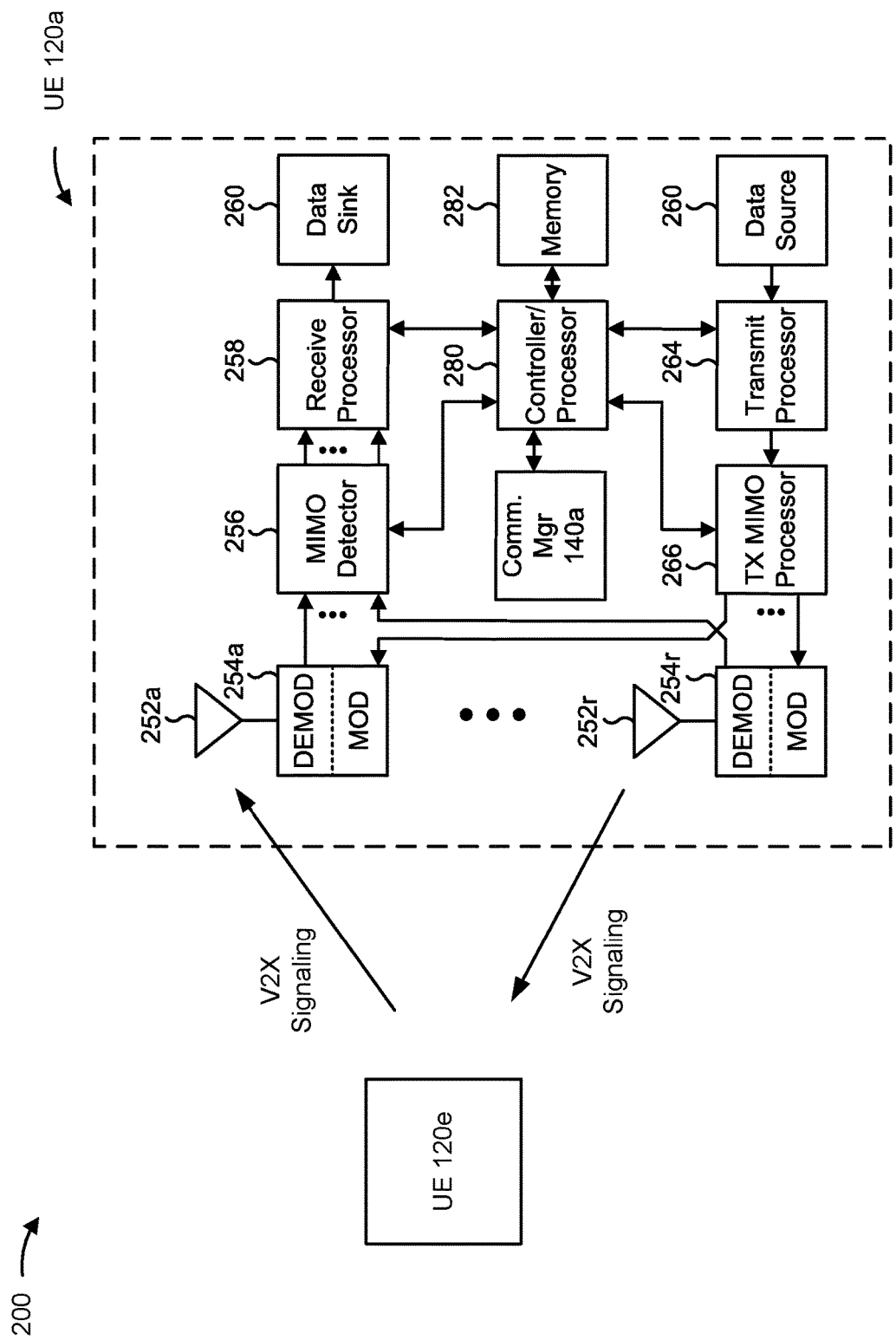
FIG. 2 is a block diagram conceptually illustrating an example of a first user equipment (UE) in communication with a second UE in a wireless communication network, in accordance with various aspects of the present disclosure.

FIG. 2 shows a block diagram of a design 200 of UE 120*a* and UE 120*e*. UE 120*a* may be equipped with R antennas 252*a* through 252*r*, where in general R≥1.

At UE 120*a*, antennas 252*a* through 252*r* may receive the downlink signals from, for example, UE 120*e*, a base station 110, and/or the like and may provide received signals to demodulators (DEMODs) 254*a* through 254*r*, respectively. The downlink signals may include link layer messages, RRC messages, V2X layer messages, and/or the like. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120*a* to a data sink 260, and provide decoded control information and system information to a controller/processor 280. A channel processor may determine reference signal received power (RSRP), received signal strength indicator (RSSI), reference signal received quality (RSRQ), channel quality indicator (CQI), a combination thereof, and/or the like. In some aspects, one or more components of UE 120*a* may be included in a housing.

On the uplink, at UE 120, a transmit processor 264 may receive and process data from a data source 262 and control information (e.g., for reports comprising RSRP, RSSI, RSRQ, CQI, a combination thereof, and/or the like) from controller/processor 280. For example, UE 120*a* may receive and process data associated with a link layer discovery message, a link layer discovery response message, a combination thereof, and/or the like. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, a combination thereof, and/or the like), and transmitted to, for example, UE 120*e*.

Controller/processor 280 of UE 120*a* and/or any other component(s) of FIG. 2 may perform one or more techniques associated with V2X layer signaling, as described in more detail elsewhere herein. For example, controller/processor 280 of UE 120*a*, and/or any other component(s) of FIG. 2 may perform or direct operations of, for example, process 700 of FIG. 7, process 800 of FIG. 8, and/or other processes as described herein. Memory 282 may store data and program codes for UE 120*a*. Although some aspects are described in terms of UE 120*a*, aspects may be applicable to other UEs 120, such as UE 120*e*.

In some aspects, the UE 120*a* may include means for encapsulating, into a link layer sidelink management message, upper layer signaling for managing a direct communication connection with UE 120*e*, means for transmitting, to UE 120*e*, the link layer sidelink management message including the upper layer signaling, a combination thereof, and/or the like.

In some aspects, the UE 120*e* may include means for receiving, from UE 120*a*, a link layer sidelink management message that conveys upper layer signaling, means for selectively transmitting, to UE 120*a*, a link layer sidelink response message based at least in part on a content of the upper layer signaling in the link layer sidelink management message, a combination thereof, and/or the like.

Additionally, or alternatively, the UEs 120*a* and 120*e* may include means for performing one or more other operations described herein. In some aspects, such means may include the respective communication managers 140*a* and 140*e*. Additionally, or alternatively, such means may include one or more components of the UE 120*a* or the UE 120*e* described in connection with FIG. 2.

As indicated above, FIG. 2 is provided merely as an example. Other examples may differ from what was described with regard to FIG. 2.

Figure 3:
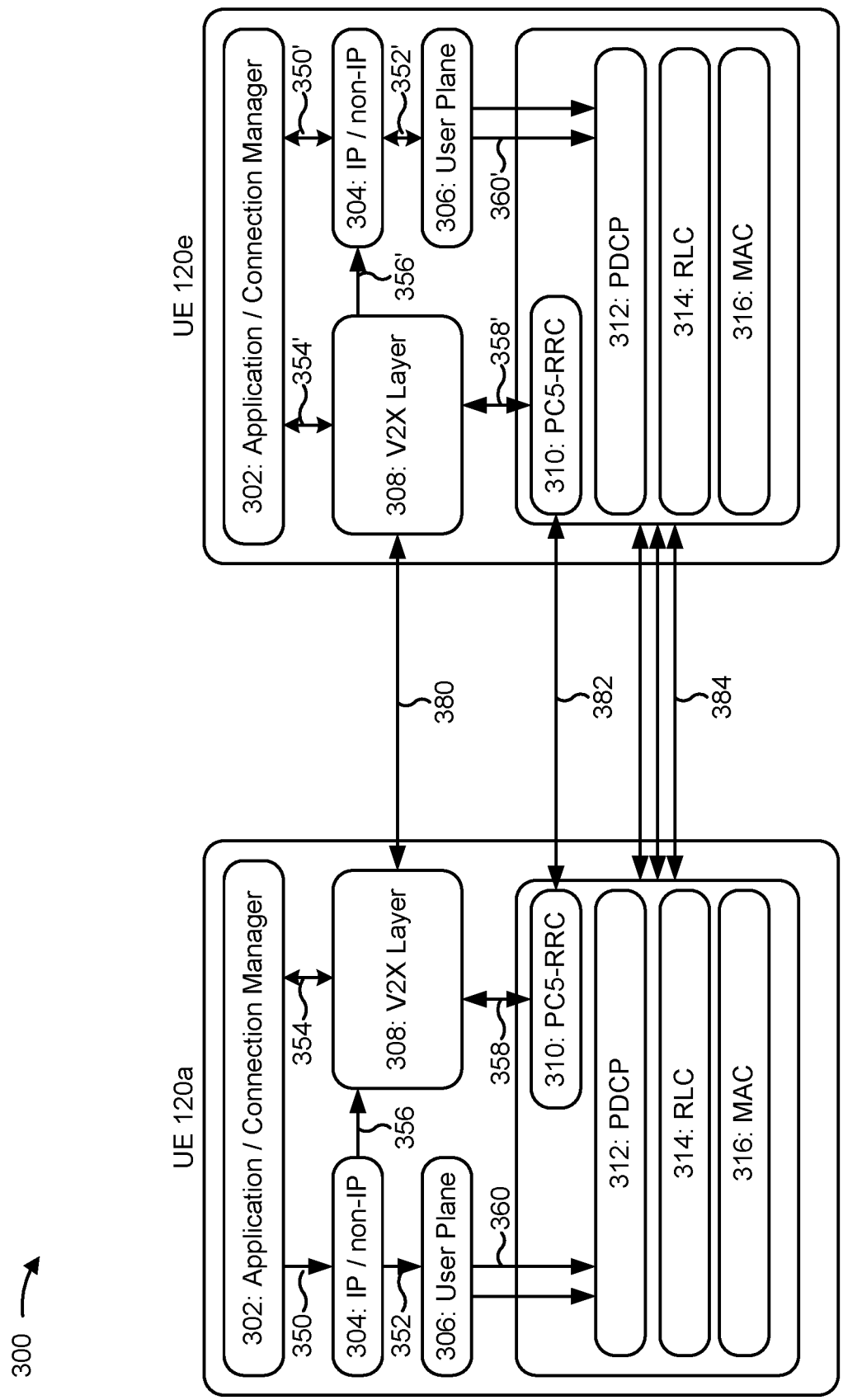
FIG. 3 is a diagram illustrating an example of different layers of the first UE in communication with different layers of the second UE to perform vehicle-to-everything (V2X) layer signaling, in accordance with various aspects of the present disclosure.

FIG. 3 is a diagram illustrating an example 300 of cross-layer interactions using V2X layer signaling, in accordance with various aspects of the present disclosure. FIG. 3 represents a conceptual diagram of cross-layer interactions in UEs 120.

As shown in FIG. 3, UE 120 a and a UE 120e may include respective application/connection manager layers 302, internet protocol (IP)/non-IP data layers 304, user plane layers 306, V2X layers 308, PC5-RRC layers 310, PDCP layers 312, RLC layers 314, and MAC layers 316. It should be noted that the UE 120a and UE 120e may both transmit and receive traffic in the communication. The UE 120a may initiate a unicast direct communication link to the UE 120e, and, at a different time or for a different application or service, the UE 120e may also initiate another unicast direct communication link to the UE 120a.

As further shown in FIG. 3, and by reference numbers 350, 352, 354, and 356 in UE 120a, application data may be passed from application/connection manager layer 302 to IP/non-IP data layer 304, to user plane layer 306, and further down to the Access Stratum layer, as shown by reference number 360 (e.g., to PDCP 312, RLC 314, and MAC 316), to be delivered over the physical layer over an air interface. The IP/non-IP layer 304 may be in charge of handling the encapsulation of the application data, either using IP header and corresponding transport layer protocol TCP or UDP or using non-IP headers (e.g. the V2X native message formats, IEEE1609.3 WSMP, or ETSI-ITS GeoNetworking). Application Layer 302 or the IP/Non-IP layer 304 may be triggered by the application data to request a connection to be established towards the UE 120e for the exchange of the application data. V2X layer 308 may be caused to exchange signaling with PC5-RRC layer, and user plane layer 306 may manage bearers for quality of service (QoS) flows over PDCP layer 312, RLC layer 314, and MAC layer 316.

Similarly, as further shown in FIG. 3, and by reference numbers 358' and 360' in UE 120e, V2X layer 308 may be caused to exchange signaling with PC5-RRC layer 310, and user plane layer 306 may manage bearers for QoS flows over PDCP layer 312, RLC layer 314, and MAC layer 316. As shown by reference numbers 350', 352', in UE 120e, application data may be passed to application/connection manager layer 302 from IP/non-IP data layer 304, and from user plane layer 306. As shown by reference numbers 380, 382, and 384, messages transmitted between UE 120a and UE 120e may be conveyed at PDCP layer 312, RLC layer 314, and MAC layer 316 using physical links, which may convey PC5 data bearers for QoS flows, and may include RRC messages and/or V2X layer messages to enable a direct communication link between UE 120a and UE 120e as described in more detail herein.

As indicated above, FIG. 3 is provided as an example. Other examples may differ from what was described with respect to FIG. 3.

Figure 4:
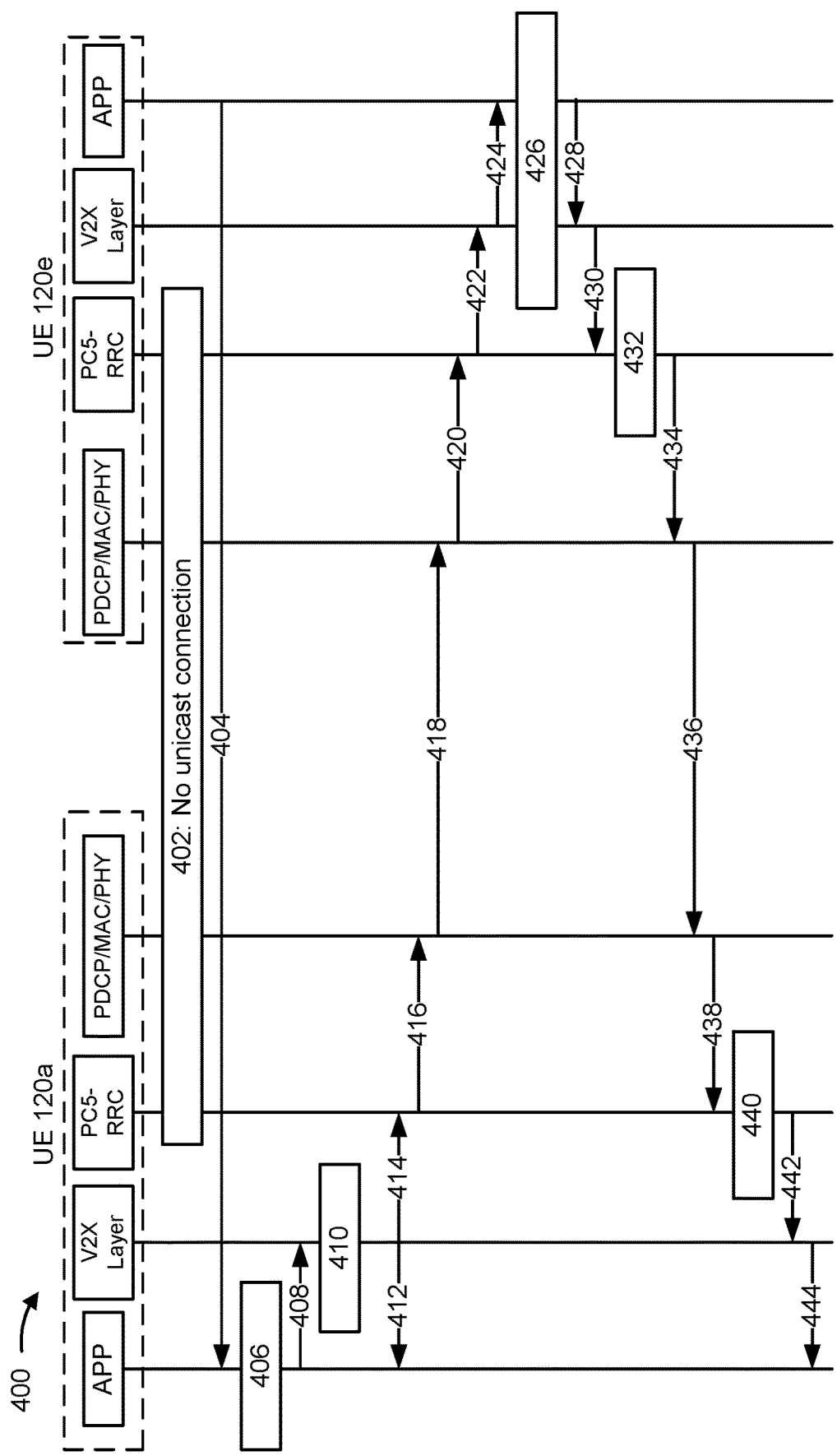
FIG. 4 is a diagram illustrating an example of inter-layer signaling for managing a new link using vehicle-to-everything (V2X) layer signaling, in accordance with various aspects of the present disclosure.

FIG. 4 is a diagram illustrating an example 400 of signaling between UEs 120, in accordance with various aspects of the present disclosure. As shown in FIG. 4, example 400 includes a UE 120a and a UE 120e. As further shown in FIG. 4, signaling is illustrated for an application (APP) layer (e.g., which may correspond to application/connection manager layer 302, IP/non-IP data layer 304, a combination thereof, and/or the like), a V2X layer (e.g., which may correspond to V2X layer 308), a PC5-RRC layer (e.g., which may correspond to PC5-RRC layer 310), and PDCP/MAC/PHY layers (e.g., which may correspond to PDCP layer 312, RLC layer 314, MAC layer 316, a combination thereof, and/or the like) of UE 120a and UE 120e.

As further shown in FIG. 4, and by reference number 402, UE 120a and UE 120e may lack a unicast connection for communication. As shown by reference number 404, a triggering event may cause an initial link setup for a unicast link to occur for UEs 120 that do not have a unicast link. For example, UE 120e may provide an application layer message discovery indication of a destination identifier. In this case, the destination identifier may be an upper layer identifier of UE 120e.

As further shown in FIG. 4, and by reference number 406, UE 120a may determine that a new unicast connection is to be established based at least in part on the triggering event. For example, UE 120a may determine that a new link (i.e., the new unicast connection) is needed based at least in part on detecting a new target device for communication (e.g., UE 120e) at the APP layer. For example, the APP layer may determine an application layer identifier (e.g., a temporary station identifier) or a link layer identifier (L2 ID), a combination thereof, and/or the like for UE 120e based at least in part on one or more applications operating at the APP layer. For example, this could be due to the reception of a broadcasted BSM message from the second UE. In some aspects, a V2X layer or a higher layer connection manager (e.g., at the APP layer) may manage whether a new unicast link is to be established or whether an existing unicast link is reusable. In some aspects, UE 120a may determine whether to establish a new unicast link based at least in part on QoS requirements of transmissions that are to occur via the new unicast link. For example, a connection manager or the V2X layer may determine whether a new data bearer for a new QoS flow is to be setup over the PC5 unicast link or whether an existing data bearer and QoS flow is usable for the new application. In some aspects, if the connection manager or the V2X layer determines that an existing data bearer for a QoS flow can be reused, a handler or a socket may be passed from the V2X layer to the APP layer to enable the APP layer to use the existing unicast link. Otherwise, the V2X layer will pass the handler after setting up the new unicast link following the procedure described thereafter.

As further shown in FIG. 4, and by reference number 408, at the APP layer, UE 120a may pass a link request to the V2X layer. In some aspects, the link request may include a service identifier, the destination identifier (e.g., the upper layer identifier of UE 120e), a QoS parameter set and a range parameter for a new unicast connection, an indicator that the new unicast connection is to be for unicast communication, a combination thereof, and/or the like. In some aspects, the destination identifier may be an upper layer device identifier (e.g., the application layer temporary station ID that is not directly manageable by the V2X layer) or an L2 ID (e.g., that is directly manageable by the V2X layer). For example, UE 120a may pass the link request message with the destination identifier and an indicator of a type of destination identifier that is provided. In this way, UE 120a may enable the V2X layer to determine whether to manage the destination identifier or whether to communicate with the APP layer to manage the destination identifier. In this case, if an upper layer device identifier is provided, the V2X layer may need to determine the L2 ID to be used for the signaling procedure in managing the unicast connection (e.g., the V2X layer may start link management with a multicast or broadcast L2 ID that is mapped from the service type).

In some aspects, the QoS parameter may be different from previous QoS parameters relating to previous unicast links but a destination identifier may be the same as previous destination identifiers (e.g., the same L2 ID). In this case, the V2X layer may initiate signaling to add a QoS flow or modify the QoS of a data bearer to an existing destination (e.g., an existing UE 120e) rather than to add a new unicast link to this destination (e.g., the UE 120e). In some aspects, the QoS parameter may include a plurality of QoS requirements (e.g., relating to different sets of 5G QoS identifiers, data rates, delay budgets, and ranges). In this case, the V2X layer may determine to manage a plurality of bearers for the QoS flows corresponding to the plurality of QoS requirements.

As further shown in FIG. 4, and by reference number 410, at the V2X layer, UE 120a may determine if establishment of a new unicast link and/or QoS flow is needed. For example, UE 120a may determine whether an existing unicast link or QoS flow may satisfy the link request. In this case, as described above, when a new destination identifier is provided, UE 120a may determine to establish a new unicast link. In contrast, when an existing destination identifier is provided but a new QoS parameter is provided, UE 120a may determine to establish a new QoS flow using an existing unicast link. In this case, as shown by reference number 412, UE 120a may pass a link response to the APP layer to provide a handler to the existing link. For example, at the V2X layer, UE 120a may pass the link response message to the APP layer (e.g., which may include link handler information, such as a link identifier, a flow identifier, a combination thereof, and/or the like) to enable the APP layer to use the existing link.

In contrast, as shown by reference number 414, UE 120a may pass, from the V2X layer to the PC5-RRC layer, a link establishment request message based at least in part on determining that a new unicast link is to be established. In some aspects, the link establishment request message may include a link layer identifier (L2 ID), a QoS parameter, a V2X layer message including the upper layer identifier, a cause code, a combination thereof, and/or the like. In some aspects, UE 120a may pass other types of link management messages, such as a link update message, a link release message, a link identification message, a combination thereof, and/or the like. In some aspects, UE 120a may use a multicast or broadcast L2 ID. For example, based at least in part on mapping information of a service identifier received from the APP layer, the V2X layer may include a multicast or broadcast L2 ID in the link management request to enable UE 120a to transmit to UE 120e when the L2 ID of UE 120e is not known. In other words, UE 120a may broadcast a subsequent message, described herein, to UE 120e and other UEs 120 to attempt to establish a new link with UE 120e when UE 120a does not have information identifying the L2 ID of UE 120e.

In some aspects, UE 120a may pass a plurality of QoS parameters, as described above to trigger management of a plurality of QoS flows for the new unicast link. In some aspects, UE 120a may include V2X layer context information in the V2X layer message. For example, the V2X layer may include a QoS flow profile, a security context, an upper layer identifier, an L2 ID, an Internet protocol (IP) address, a combination thereof, and/or the like. In some aspects, the V2X layer may include a cause code indicating that a new unicast link is to be established. Additionally, or alternatively, as described in more detail below, the V2X layer may include a cause code indicating that a unicast link is to be updated, a unicast link is to be re-established, a combination thereof, and/or the like.

As further shown in FIG. 4, and by reference number 416, at the PC5-RRC layer, UE 120a may pass an RRC sidelink connection request message to the PDCP/MAC/PHY layers. In some aspects, the RRC sidelink connection request message may include a destination L2 ID, the aforementioned V2X layer message, a transmitter profile parameter, a bearer profile parameter, a combination thereof, and/or the like. In some aspects, at the PC5-RRC layer, UE 120a may convert QoS profiles received from the V2X layer into bearer profiles for managing one or more bearers for the new link. In some aspects, at the PC5-RRC layer, UE 120a may derive a transmission profile for the new unicast link and/or each bearer thereof. In some aspects, at the PC5-RRC layer, UE 120a may indicate the L2 ID to the PDCP/MAC/PHY layers to enable message transmission at the PDCP/MAC/PHY layers. In some aspects, at the PC5-RRC layer, UE 120a may pass an indicator that the link is a PC5 link for the PC5-RRC layer.

As further shown in FIG. 4, and by reference number 418, at the PDCP/MAC/PHY layers, UE 120a may send (e.g., via a PC5 interface) the PC5-RRC sidelink connection request message over a signaling radio bearer (e.g., Signaling Radio Bearer of type 0 (SRB0)) to UE 120e. For example, using the L2 ID of UE 120e, a broadcast or multi-cast L2 ID, a combination thereof, and/or the like, UE 120a may signal to UE 120e that a new link is to be established. As shown by reference number 420, at the PDCP/MAC/PHY layers, UE 120e may pass the received RRC sidelink connection request message to the PC5-RRC layer to establish a connection to UE 120a. In some aspects, UE 120e may create a context for the new link at the RRC layer. For example, UE 120e may determine one or more bearers for one or more QoS flows that are to be established.

As further shown in FIG. 4, and by reference number 422, at the PC5-RRC layer, UE 120e may pass the link management request message received within the RRC sidelink connection request message to the V2X layer. In some aspects, when a QoS flow is not supported by UE 120e, the PC5-RRC layer may pass an indication that the QoS flow is not supported to the V2X layer. Additionally, or alternatively, the PC5-RRC layer may pass an indication of a transmission profile, a V2X layer message, a combination thereof, and/or the like to enable link management at the V2X layer. In some aspects, the PC5-RRC layer may delay managing the link context at RRC layer until the V2X layer responds to messaging from the PC5-RRC layer to reduce processing in the case where the V2X layer fails to or rejects the link management based on the request and received V2X Layer message. The PC5-RRC layer may also pass the source L2 ID of the received message to the V2X layer.

As further shown in FIG. 4, and by reference number 424, at the V2X layer, UE 120e may pass a link request to the APP layer. In this case, the V2X layer may pass the link request to verify link management, authorize link management, a combination thereof, and/or the like. In some aspects, the link request may include a link handler generated at the PC5-RRC layer or the V2X layer to enable the APP layer to communicate using the link. As shown by reference number 426, at the APP layer, UE 120e may determine whether to provide a response to the link request and to UE 120a. For example, UE 120e may verify and/or authorize link management, and may provide a response indicating that the link management is verified and/or authorized. As shown by reference number 428, at the APP layer, UE 120e may pass a link acknowledgement to the V2X layer. In some aspects, the link acknowledgement may include information identifying a QoS profile, a link handler, a combination thereof, and/or the like. As shown by reference number 430, at the V2X layer, UE 120e may pass a link management response message to the PC5-RRC layer. In some aspects, the link management response message may include a source L2 ID of the second UE, a L2 ID of the received message (i.e., source L2 ID of the first UE), a QoS parameter, a V2X layer message, a cause code, a combination thereof, and/or the like.

As further shown in FIG. 4, and by reference number 432, at the PC5-RRC layer, UE 120e may establish a context for one or more bearers to support a new unicast connection. As described above, in some cases, the PC5-RRC layer may establish the context before receiving the response message from the V2X layer. As shown by reference number 434, at the PC5-RRC layer, UE 120e may pass an RRC sidelink connection response message to the PDCP/MAC/PHY layers. In some aspects, the RRC sidelink connection response message may include a destination L2 ID, a source L2 ID, a QoS parameter, a V2X layer message, a transmission profile, a bearer profile, a cause code and/or the like. As shown by reference number 436, at the PDCP/MAC/PHY layers, UE 120e may provide, using an SRB0 message over a PC5 interface, a message to UE 120a at the PDCH/MAC/PHY layers.

As further shown in FIG. 4, and by reference number 438, at the PDCP/MAC/PHY layers, UE 120a may pass an RRC sidelink connection response message to the PC5-RRC layer. In some aspects, the RRC sidelink connection response message may include an L2 ID of UE 120e. As shown by reference number 440, at the PC5-RRC layer, UE 120a may establish a context for one or more bearers for the new unicast connection. As shown by reference number 442, at the PC5-RRC layer UE 120a may pass a link management response message to the V2X layer to provide the context for the new link to the V2X layer. As shown by reference number 444, at the V2X layer, UE 120a may pass a link response message to the APP layer to enable the APP layer to communicate using the new link.

As indicated above, FIG. 4 is provided as an example. Other examples may differ from what was described with respect to FIG. 4.

Figure 5:
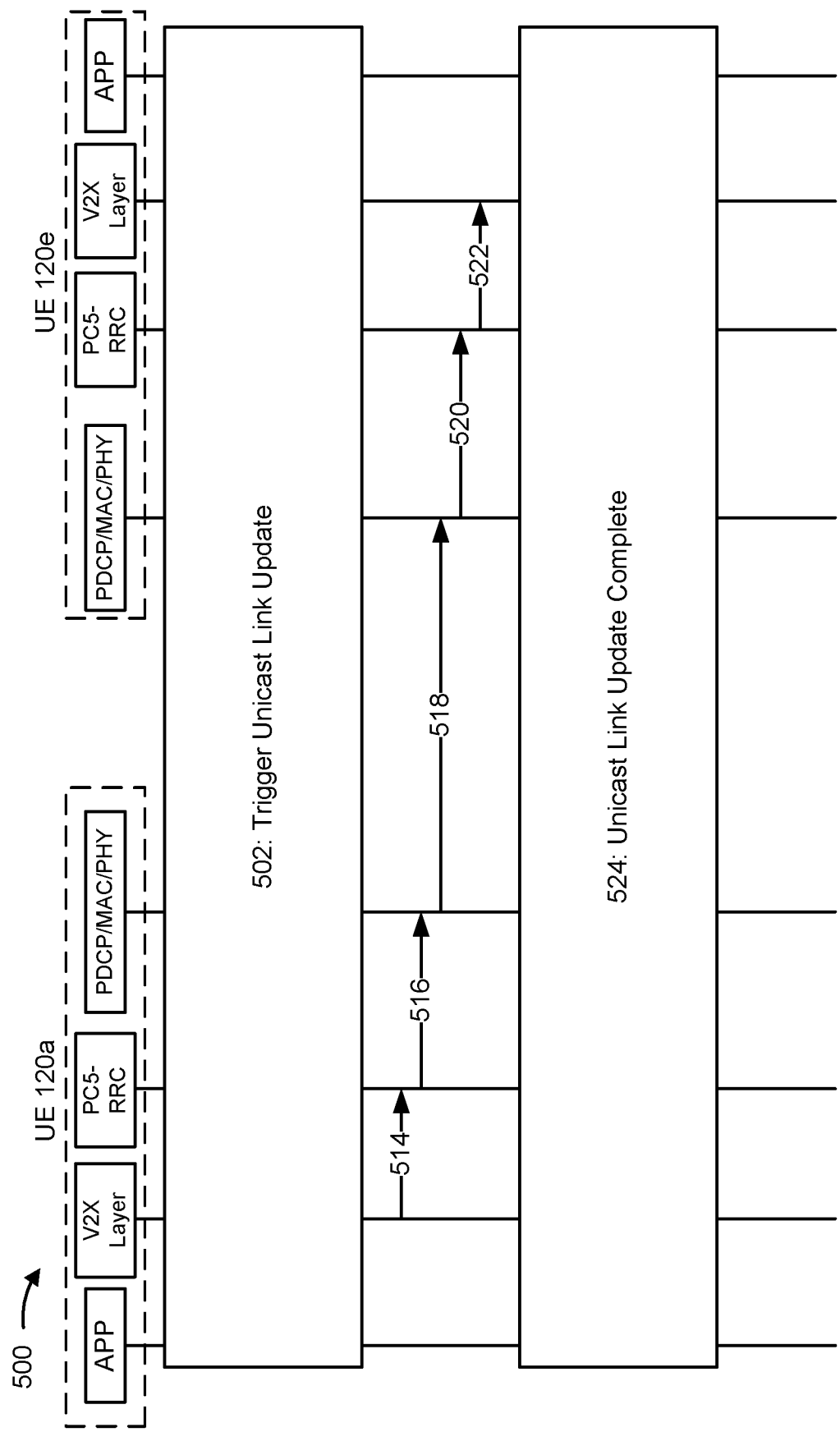
FIG. 5 is a diagram illustrating an example of inter-layer signaling for updating a link using vehicle-to-everything (V2X) layer signaling, in accordance with various aspects of the present disclosure.

FIG. 5 is a diagram illustrating an example 500 of signaling between UEs 120, in accordance with various aspects of the present disclosure. FIG. 5 shows an example of unicast link update (e.g., when an active unicast link already exists for UE 120a and UE 120e).

As shown in FIG. 5, and by reference number 502, UE 120a may determine to update a unicast link between UE 120a and UE 120e. For example, UE 120a may determine that a new unicast connection is needed, and may determine, based at least in part on information relating to existing links, existing QoS flows, a combination thereof, and/or the like, that an existing unicast link may be updated rather than a new unicast link having to be established, as described herein with regard to reference number 410 of FIG. 4.

As further shown in FIG. 5, and by reference number 514, at the V2X layer, UE 120a may provide a link management request to the PC5-RRC layer. For example, UE 120a may pass a link management request that includes an L2 ID, a QoS profile, a V2X layer message, a cause code (e.g., indicating that a link is to be updated rather than established), a combination thereof, and/or the like. As shown by reference number 516, at the PC5-RRC layer, UE 120a may provide (e.g., to the PDCP/MAC/PHY layers) an RRC sidelink connection reconfiguration message that includes a destination L2 ID, the V2X layer message, a transmission profile, a bearer profile, a combination thereof, and/or the like. As shown by reference number 518, at the PDCP/MAC/PHY layers, UE 120a may send (e.g., via a PC5 interface) a PC5-RRC sidelink connection request message over a signaling radio bearer of type 1 (SRB1). In this case, the SRB1 message may be used based at least in part on UE 120a already having the destination L2 ID (e.g., based at least in part on an existing link being updated rather than a new link being established), thereby obviating an L2 ID discovery procedure. For example, the SRB1 may use transmission configuration information associated with an already existing unicast link (e.g., a RAT type, a modulation scheme, a power control parameter, a QoS level, an acknowledgement scheme type, a security protection characteristic, and/or the like), rather than needing to include and configure information as for an SRB0 for a new unicast link.

As further shown in FIG. 5, and by reference number 520, at the PDCP/MAC/PHY layers of UE 120e, UE 120e may pass the received RRC sidelink connection request message to the PC5-RRC layer to update the connection for UE 120a. In some aspects, the message may include a destination L2 ID, a transmission profile, a bearer profile, a V2X layer message, a source L2 ID, a combination thereof, and/or the like. As shown by reference number 522, at the PC5-RRC layer of UE 120e, UE 120e may pass the link management request message received within the RRC sidelink connection request message to the V2X layer (e.g., that includes an L2 ID, a QoS profile a V2X layer message, a cause code, a combination thereof, and/or the like). In this way, respective V2X layers of UE 120a and UE 120e may communicate to enable a unicast link update. As shown by reference number 524, the V2X layer at UE 120e may pass information to the APP layer of UE 120e regarding the update to the unicast link, thereby enabling the update to the unicast link. As shown by reference number 526, UE 120e and/or UE 120a may pass one or more messages to update the unicast link and/or a context thereof based at least in part on passing the V2X layer messaging from UE 120a to UE 120e, as described in more detail above with regard to reference numbers 424 to 444 of FIG. 4.

As indicated above, FIG. 5 is provided as an example. Other examples may differ from what was described with respect to FIG. 5.

Figure 6:
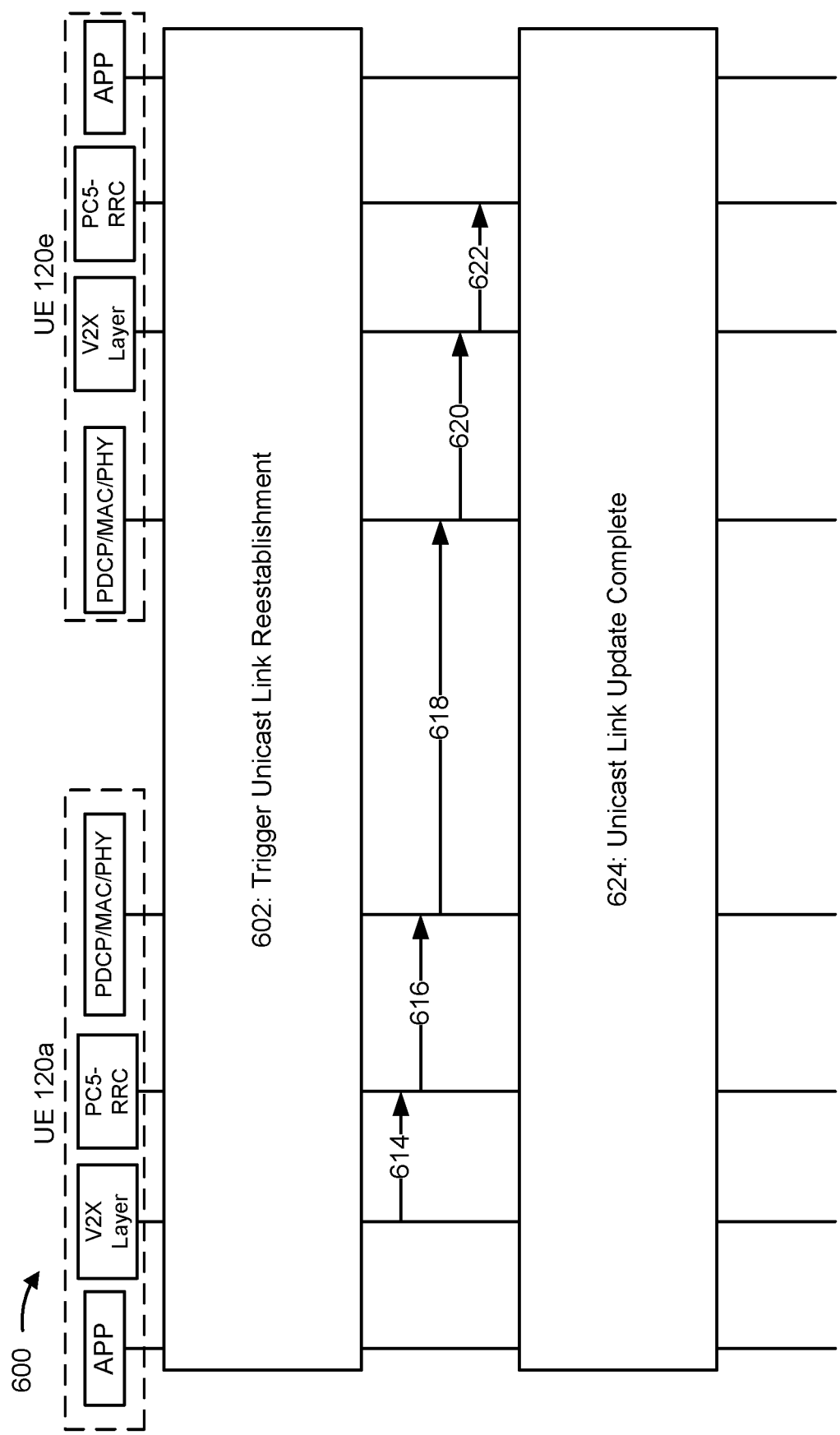
FIG. 6 is a diagram illustrating an example of inter-layer signaling for managing a link using vehicle-to-everything (V2X) layer signaling, in accordance with various aspects of the present disclosure.

FIG. 6 is a diagram illustrating an example 600 of signaling between UEs 120, in accordance with various aspects of the present disclosure. FIG. 6 shows an example of unicast link re-management (e.g., after an RRC layer teardown).

As shown in FIG. 6, and by reference number 602, UE 120a may determine to re-establish a unicast link between UE 120a and UE 120e. For example, UE 120a may determine that a unicast connection is needed, and may determine, based at least in part on information relating to existing unicast links, existing QoS flows, a combination thereof, and/or the like, that a unicast link may be re-established rather than a new unicast link having to be established, as described above with regard to reference number 410 of FIG. 4.

As further shown in FIG. 6, and by reference number 614, at the V2X layer, UE 120a may provide a link management request to the PC5-RRC layer. For example, UE 120a may pass a link management request that includes an L2 ID, a QoS profile, a V2X layer message, a cause code (e.g., indicating that a link is to be re-established rather than established), a combination thereof, and/or the like. As shown by reference number 616, at the PC5-RRC layer, UE 120a may provide (e.g., to the PDCP/MAC/PHY layers) an RRC sidelink connection reconfiguration message that includes a destination L2 ID, the aforementioned V2X layer message, a transmission profile, a bearer profile, a combination thereof, and/or the like. In this case, the PC5-RRC layer may be in an idle state, and the V2X layer may know the destination L2 ID, but the PC5-RRC layer may not have a context (e.g., bearer information) for a link to UE 120e. As shown by reference number 618, at the PDCP/MAC/PHY layers, UE 120a may send (e.g., via a PC5 interface) an SRB0 or SRB1 message. In this case, the SRB0 message or the SRB1 message may be used based at least in part on UE 120a already having the destination L2 ID (e.g., based at least in part on an existing link being re-established rather than a new link being established), thereby obviating an L2 ID discovery procedure.

As further shown in FIG. 6, and by reference number 620, at the PDCP/MAC/PHY layers of UE 120e, UE 120e may pass the received RRC sidelink connection request message to the PC5-RRC layer (e.g., including a destination L2 ID, a transmission profile, a bearer profile, a V2X layer message, a session and resource control (SRC) L2 ID, a combination thereof, and/or the like). As shown by reference number 622, at the PC5-RRC layer of UE 120e, UE 120e may pass a link management request to the V2X layer (e.g., that includes an L2 ID, a QoS profile a V2X layer message, a cause code, a combination thereof, and/or the like), and may re-establish a context. In this way, respective V2X layers of UE 120a and UE 120e may communicate to re-establish a unicast link. As shown by reference number 624, the V2X layer at UE 120e may pass information to the APP layer of UE 120e regarding the update to the unicast link, thereby enabling the re-management of the unicast link. As shown by reference number 626, UE 120e and/or UE 120a may pass one or more messages to re-establish the unicast link based at least in part on passing the V2X layer messaging from UE 120a to UE 120e, as described in more detail above with regard to reference numbers 424 to 444 of FIG. 4.

As indicated above, FIG. 6 is provided as an example. Other examples may differ from what was described with respect to FIG. 6.

Figure 7:
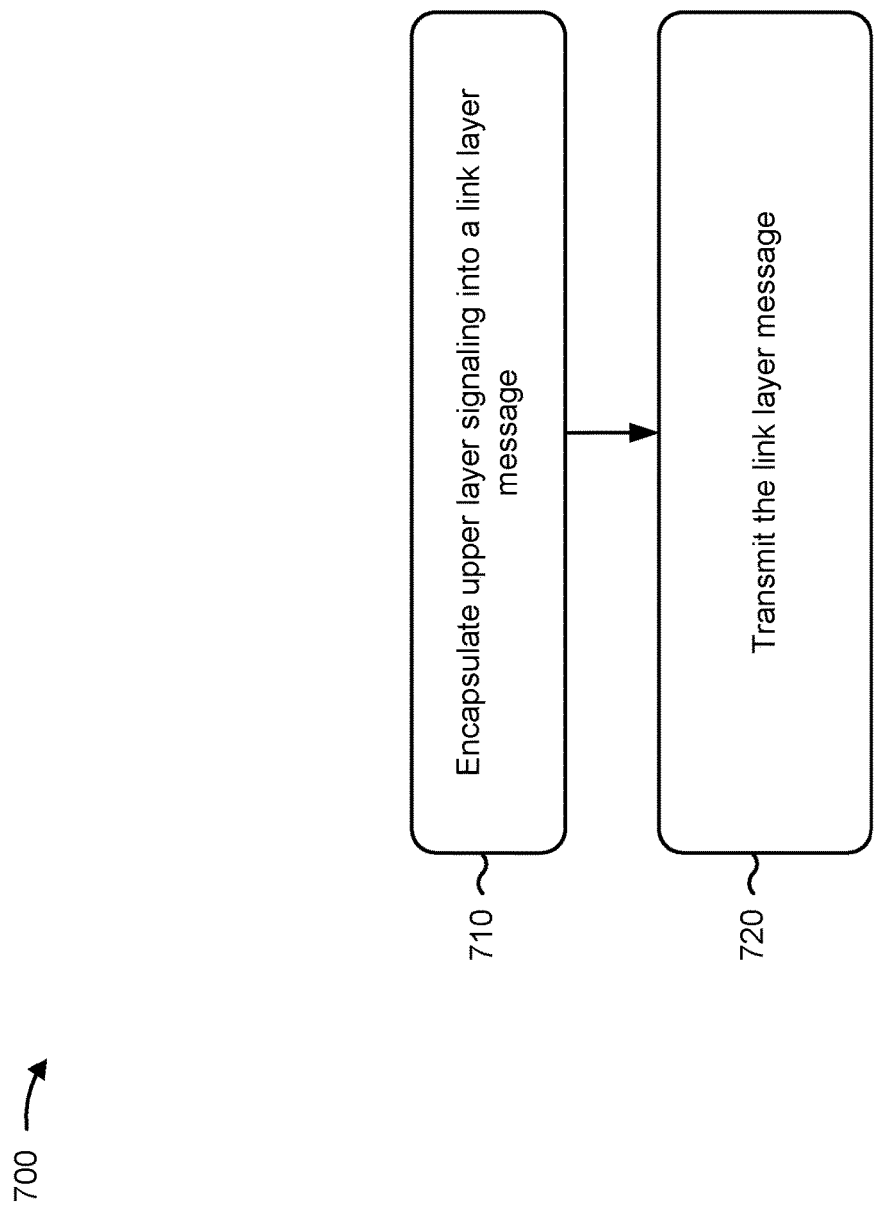
FIG. 7 is a diagram illustrating an example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where a first UE (e.g., a UE 120, such as UE 120a) performs V2X layer signaling.

As shown in FIG. 7, in some aspects, process 700 may include encapsulating upper layer signaling into a link layer message (block 710). For example, the first UE (e.g., using controller/processor 280, transmit processor 264, TX MIMO processor 266, MOD 254, antenna 252, a combination thereof, and/or the like) may encapsulate, into a link layer sidelink management message, V2X signaling for managing a direct communication connection with a second UE, as described in more detail above. In some aspects, encapsulating upper layer signaling into a link layer message may include setting bits within the link layer message to convey the upper layer signaling.

As shown in FIG. 7, in some aspects, process 700 may include transmitting the link layer message (block 720). For example, the first UE (e.g., using controller/processor 280, transmit processor 264, TX MIMO processor 266, MOD 254, antenna 252, a combination thereof, and/or the like) may transmit, to the second UE, the link layer sidelink management message including the upper layer signaling, as described in more detail above.

Process 700 may include additional aspects, such as any single aspect or any combination of aspects described below and/or in connection with one or more other processes described elsewhere herein.

In a first aspect, the direct communication connection is at least one of an application layer communication connection, a PC5 signaling layer communication, a V2X communication connection, or a combination thereof. In a second aspect, alone or in combination with the first aspect, the link layer sidelink management message is a radio resource control message. In a third aspect, alone or in combination with one or more of the first and second aspects, the first UE may selectively receive a response message for the link layer sidelink management message based at least in part on a content of the upper layer signaling. In a fourth aspect, alone or in combination with one or more of the first through third aspects, the first UE may update, with the second UE, a communication link based at least in part on a content of the upper layer signaling, wherein updating the communication link includes generating a context for the communication link.

In a fifth aspect, alone or in combination with one or more of the first through fourth aspects, the link layer sidelink management message includes information identifying radio resource control layer handling of a quality of service flow or a bearer associated with a sidelink communication link. In a sixth aspect, alone or in combination with one or more of the first through fifth aspects, a response message to the link layer sidelink management message is triggered by the upper layer signaling. In a seventh aspect, alone or in combination with one or more of the first through sixth aspects, the link layer sidelink management message includes information identifying at least one of: a link layer identifier (L2 ID) for the link layer identifier discovery procedure, an upper layer identifier associated with the upper layer signaling, a cause code, a service identifier, a communication type indicator, a quality of service indicator, or a bearer profile.

In an eighth aspect, alone or in combination with one or more of the first through seventh aspects, the link layer sidelink management message is conveyed via a signaling radio bearer. In a ninth aspect, alone or in combination with one or more of the first through eighth aspects, the link layer sidelink management message is a radio resource control (RRC) connection management request or an RRC reconfiguration message. In a tenth aspect, alone or in combination with one or more of the first through ninth aspects, the link layer sidelink management message is transmitted based at least in part on detecting the second UE.

In an eleventh aspect, alone or in combination with one or more of the first through tenth aspects, the first UE may maintain, at an upper layer, an association between an upper layer identifier and a link layer identifier (L2 ID). In a twelfth aspect, alone or in combination with one or more of the first through eleventh aspects, the first UE may maintain, at an upper layer, a link handler identifying a sidelink communication link or a bearer over the sidelink communication link. In a thirteenth aspect, alone or in combination with one or more of the first through twelfth aspects, the first UE may maintain, at a link layer, a state machine for each sidelink communication link.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
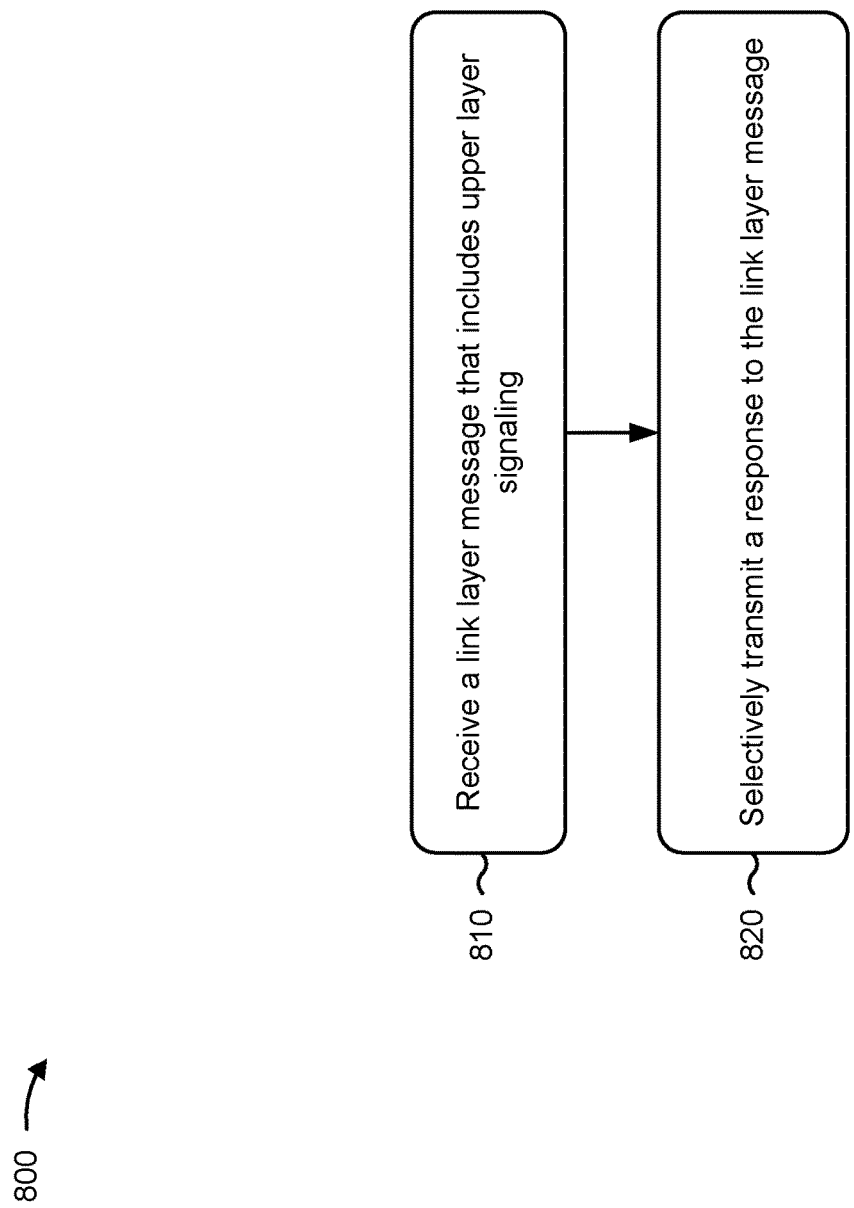
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where a second UE (e.g., a UE 120, such as UE 120e) performs V2X layer signaling.

As shown in FIG. 8, in some aspects, process 800 may include receiving a link layer message that includes upper layer signaling (block 810). For example, the second UE (e.g., using antenna 252, DEMOD 254, MIMO detector 256, receive processor 258, controller/processor 280, a combination thereof, and/or the like) may receive, from a first UE, a link layer sidelink management message that conveys V2X signaling, as described in more detail above. In some aspects, the link layer sidelink management message includes information to trigger a link layer identifier discovery procedure.

As shown in FIG. 8, in some aspects, process 800 may include selectively transmitting a response to the link layer message (block 820). For example, the second UE (e.g., using controller/processor 280, transmit processor 264, TX MIMO processor 266, MOD 254, antenna 252, a combination thereof, and/or the like) may selectively transmit, to the first UE, a link layer sidelink response message based at least in part on a content of the upper layer signaling in the link layer sidelink management message, as described in more detail above.

Process 800 may include additional aspects, such as any single aspect or any combination of aspects described below and/or in connection with one or more other processes described elsewhere herein.

In a first aspect, the link layer sidelink management message is a radio resource control (RRC) setup request message and the link layer sidelink response message is an RRC setup message. In a second aspect, alone or in combination with the first aspect, the second UE may transmit the link layer sidelink response message including a link layer identifier (L2 ID). In a third aspect, alone or in combination with one or more of the first and second aspects, the second UE may forgo transmission of the link layer sidelink response message.

In a fourth aspect, alone or in combination with one or more of the first through third aspects, the second UE may authorize the link layer sidelink management message. In a fifth aspect, alone or in combination with one or more of the first through fourth aspects, the second UE may determine whether to establish a new communication link based at least in part on the link layer sidelink management message and may establish the new communication link or reusing an existing communication link based at least in part on determining whether to establish the new communication link. In a sixth aspect, alone or in combination with one or more of the first through fifth aspects, the second UE may provide an indicator of an existing communication link to reuse the existing communication link as a response to the link layer sidelink management message.

In a seventh aspect, alone or in combination with one or more of the first through sixth aspects, the link layer sidelink response message includes response upper signaling. In an eighth aspect, alone or in combination with one or more of the first through seventh aspects, the link layer sidelink response message includes information identifying at least one of: a link layer identifier (L2 ID) for the link layer identifier discovery procedure, an upper layer identifier associated with the upper layer signaling, a cause code, a quality of service indicator, or a bearer profile. In a ninth aspect, alone or in combination with one or more of the first through eighth aspects, the second UE may establish a sidelink communication link with the first UE in connection with transmitting the link layer sidelink response message.

In a tenth aspect, alone or in combination with one or more of the first through ninth aspects, the second UE may maintain, at an upper layer, an association between an upper layer identifier and a link layer identifier (L2 ID). In an eleventh aspect, alone or in combination with one or more of the first through tenth aspects, the second UE may maintain, at an upper layer, a link identifier for a sidelink communication link. In a twelfth aspect, alone or in combination with one or more of the first through eleventh aspects, the second UE may maintain, at a link layer, a state machine for each sidelink communication link.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a first user equipment (UE), comprising:
   encapsulating, into a link layer sidelink management message, upper layer signaling for managing a direct communication connection with a second UE;
   transmitting, to the second UE, the link layer sidelink management message including the upper layer signaling; and
   updating, with the second UE, a communication link based at least in part on a content of the upper layer signaling,
   wherein updating the communication link includes generating a context for the communication link.

2. The method of claim 1, wherein a response message to the link layer sidelink management message is triggered by the upper layer signaling.

3. The method of claim 1, wherein the link layer sidelink management message is conveyed via a signaling radio bearer.

4. The method of claim 1, wherein the link layer sidelink management message is a radio resource control message.

5. The method of claim 1, further comprising:
   selectively receiving a response message for the link layer sidelink management message based at least in part on a content of the upper layer signaling.

6. The method of claim 1, wherein the link layer sidelink management message includes information identifying radio resource control layer handling of a quality of service flow, a bearer associated with a sidelink communication link, or a combination thereof.

7. The method of claim 1, wherein the link layer sidelink management message includes information identifying at least one of:
   a link layer identifier (L2 ID) for a link layer identifier discovery procedure,
   an upper layer identifier associated with the upper layer signaling,
   a cause code,
   a service identifier,
   a communication type indicator,
   a quality of service indicator,
   a bearer profile, or
   a combination thereof.

8. The method of claim 1, wherein the link layer sidelink management message is a radio resource control (RRC) connection management request or an RRC reconfiguration message.

9. The method of claim 1, wherein the link layer sidelink management message is transmitted based at least in part on detecting the second UE.

10. The method of claim 1, further comprising:
    maintaining, at an upper layer, a link handler identifying a sidelink communication link, a bearer over the sidelink communication link, or a combination thereof.

11. The method of claim 1, further comprising:
    maintaining, at a link layer, a state machine for each sidelink communication link.

12. The method of claim 1, wherein the link layer sidelink management message includes information to trigger a link layer identifier discovery procedure.

13. The method of claim 1, wherein the direct communication connection is at least one of an application layer communication connection, a PC5 signaling layer communication, a vehicle-to-everything (V2X) communication connection, or a combination thereof.

14. The method of claim 1, wherein the upper layer signaling comprises vehicle-to-everything (V2X) layer signaling or device to device (D2D) signaling.

15. The method of claim 1, wherein encapsulating the upper layer signaling comprises setting one or more bits within the link layer sidelink management message.

16. A method of wireless communication performed by a second user equipment (UE), comprising:
    receiving, from a first UE, a link layer sidelink management message including upper layer signaling;
    providing an indicator of an existing communication link to reuse the existing communication link as a response to the link layer sidelink management message; and
    selectively transmitting, to the first UE, a link layer sidelink response message based at least in part on a content of the upper layer signaling in the link layer sidelink management message.

17. The method of claim 16, wherein the link layer sidelink management message is a radio resource control (RRC) setup request message and the link layer sidelink response message is an RRC setup message.

18. The method of claim 16, wherein selectively transmitting the link layer sidelink response message comprises:
    transmitting the link layer sidelink response message including a link layer identifier (L2 ID).

19. The method of claim 16, wherein selectively transmitting the link layer sidelink response message comprises:
    forgoing transmission of the link layer sidelink response message.

20. The method of claim 16, further comprising:
    authorizing the link layer sidelink management message.

21. The method of claim 16, further comprising:
    determining whether to establish a new communication link based at least in part on the link layer sidelink management message; and
    managing the new communication link or reusing the existing communication link based at least in part on determining whether to establish the new communication link.

22. The method of claim 16, wherein the link layer sidelink response message includes upper layer signaling.

23. The method of claim 16, wherein the link layer sidelink response message includes information identifying at least one of:
    a link layer identifier (L2 ID) for a link layer identifier discovery procedure,
    an upper layer identifier associated with the upper layer signaling,
    a cause code,
    a quality of service indicator,
    a bearer profile, or
    a combination thereof.

24. The method of claim 16, further comprising:
    managing a sidelink communication link with the first UE in connection with transmitting the link layer sidelink response message.

25. The method of claim 16, further comprising:
    maintaining, at an upper layer, an association between an upper layer identifier and a link layer identifier (L2 ID).

26. The method of claim 16, further comprising:
    maintaining, at an upper layer, a link identifier for a sidelink communication link.

27. The method of claim 16, further comprising:
    maintaining, at a link layer, a state machine for each sidelink communication link.

28. The method of claim 16, further comprising:
    triggering a link layer identifier discovery procedure.

29. A first user equipment (UE) for wireless communication, comprising:
a memory; and
one or more processors coupled to the memory, the one or more processors configured to:
encapsulate, into a link layer sidelink management message, upper layer signaling for managing a direct communication connection with a second UE;
transmit, to the second UE, the link layer sidelink management message including the upper layer signaling; and
update, with the second UE, a communication link based at least in part on a content of the upper layer signaling,
wherein, when updating the communication link, the one or more processors are configured to generate a context for the communication link.

30. The first UE of claim 29, wherein the upper layer signaling comprises vehicle-to-everything (V2X) layer signaling or device to device (D2D) signaling.

31. A second user equipment (UE) for wireless communication, comprising:
a memory; and
one or more processors coupled to the memory, the one or more processors configured to:
receive, from a first UE, a link layer sidelink management message including upper layer signaling;
provide an indicator of an existing communication link to reuse the existing communication link as a response to the link layer sidelink management message; and
selectively transmit, to the first UE, a link layer sidelink response message based at least in part on a content of the upper layer signaling in the link layer sidelink management message.

32. The method of claim 1,
wherein the upper layer signaling comprises vehicle-to-everything (V2X) layer signaling or device to device (D2D) signaling, and
wherein encapsulating the upper layer signaling comprises setting one or more bits within the link layer sidelink management message.

33. The second UE of claim 31, wherein the upper layer signaling comprises vehicle-to-everything (V2X) layer signaling or device to device (D2D) signaling.

34. A non-transitory computer-readable medium storing one or more instructions for wireless communication, the one or more instructions comprising:
one or more instructions that, when executed by one or more processors of a user equipment (UE), cause the UE to:
encapsulate, into a link layer sidelink management message, upper layer signaling for managing a direct communication connection with a second UE; and
transmit, to the second UE, the link layer sidelink management message including the upper layer signaling; and
update, with the second UE, a communication link based at least in part on a content of the upper layer signaling,
wherein the one or more instructions that cause the UE to update the communication link cause the UE to generate a context for the communication link.

35. The non-transitory computer-readable medium of claim 34, wherein the upper layer signaling comprises vehicle-to-everything (V2X) layer signaling or device to device (D2D) signaling.

36. The non-transitory computer-readable medium of claim 34, wherein the one or more instructions that cause the UE to encapsulate the upper layer signaling cause the UE to:
encapsulate the upper layer signaling by setting one or more bits within the link layer sidelink management message.

37. The non-transitory computer-readable medium of claim 34,
wherein the upper layer signaling comprises vehicle-to-everything (V2X) layer signaling or device to device (D2D) signaling, and
wherein the one or more instructions that cause the UE to encapsulate the upper layer signaling cause the cause the UE to:
encapsulate the upper layer signaling by setting one or more bits within the link layer sidelink management message.

38. An apparatus for wireless communication, comprising:
means for encapsulating, into a link layer sidelink management message, upper layer signaling for managing a direct communication connection with a second UE;
means for transmitting, to the second UE, the link layer sidelink management message including the upper layer signaling; and
means for updating, with the second UE, a communication link based at least in part on a content of the upper layer signaling,
wherein the means for updating the communication link comprise:
means for generating a context for the communication link.

39. The apparatus of claim 38,
wherein the upper layer signaling comprises vehicle-to-everything (V2X) layer signaling or device to device (D2D) signaling, and
wherein the means for encapsulating the upper layer signaling comprise:
means for encapsulating the upper layer signaling by setting one or more bits within the link layer sidelink management message.

40. The apparatus of claim 38, wherein the upper layer signaling comprises vehicle-to-everything (V2X) layer signaling or device to device (D2D) signaling.

41. The apparatus of claim 38, wherein the means for encapsulating the upper layer signaling comprise:
means for encapsulating the upper layer signaling by setting one or more bits within the link layer sidelink management message.

* * * * *